United States Patent Office 3,378,439
Patented Apr. 16, 1968

3,378,439
METHODS OF REPELLING BIRDS
Andrew J. Reinert and Kenneth E. Cantrel, Bartlesville, Okla., assignors to Phillips Petroleum Company, a corporation of Delaware
No Drawing. Filed Feb. 16, 1966, Ser. No. 527,741
6 Claims. (Cl. 167—46)

This invention relates to bird repellents. In one aspect, this invention relates to a method of rendering a surface repellent to birds. In another aspect, this invention relates to bird repellent compositions.

The prior art is replete with devices which purportedly function to deter birds from landing and resting within a particular locale. Devices which prey upon the inherent wariness of birds such as scarecrows and noisemakers have become known as mechanical bird repellents. Although a device of this type is reasonably effective for discouraging birds from resting in open fields and the like, they are not adaptable for use on or near buildings which afford a variety of different resting places for birds. This shortcoming of the mechanical type of bird repellent has lead to the discovery of various chemical compounds which repel birds from a surface to which they are applied. Exemplary compounds within the broad class of chemical bird repellents are disclosed and claimed in copending applications Ser. No. 417,496, now abandoned filed Dec. 10, 1964, and Ser. No. 418,287, filed Dec. 14, 1964, now U.S. Patent No. 3,271,247. Although the compounds identified in these two copending applications have proven very effective for deterring birds from resting on a surface to which they have been applied, the problems associated with roosting birds have dictated continued research in an effort to discover more and better bird repellent compositions.

According to this invention, birds are discouraged from resting on a particular surface by applying an effective amount of 4 - (methylamino)pyridine to said surface. The discovery of this compound as a surface repellent to birds is very unexpected in view of the ineffectiveness of closely related compounds.

Accordingly, it is an object of this invention to provide a novel bird repellent composition.

Another object of this invention is to provide a method of rendering a surface repellent to birds.

A further object of this invention is to provide a simple and efficient method of preventing birds from resting on a particular locus.

These and other objects of the invention will become apparent to one skilled in the art after studying the following detailed description and the appended claims.

United States Patent 3,150,041, issued to Goodhue et al. Sept. 22, 1964, teaches that amino-substituted heterocyclic nitrogen compounds can be effectively employed as bird management chemicals. According to the discovery of Goodhue et al. in Patent 3,150,041, ingestion by a bird of a sufficient amount of one of the compounds of the invention produced tremors, loss of flight, fluttering, paralysis, and distress cries in the birds. As stated in the Goodhue et al. patent, the bird management chemical can be ingested by the birds by feeding the birds treated food or by injecting a sufficient amount of the chemical into the birds' bodies. The bird management chemicals of the Goodhue et al. patent have been accepted on a widespread commercial scale for controlling and managing birds.

In accordance with this invention, it has been discovered that one of the compounds disclosed in the Goodhue et al. patent is very effective for rendering a surface repellent to birds. Although 4 - (methylamino)pyridine is an effective bird management chemical when ingested by a bird as taught by Goodhue et al. in Patent 3,150,041, its utility as a surface repellent is unexpected and rather surprising in view of the ineffectiveness of a number of closely related chemicals for rendering a surface repellent to birds.

The 4 - (methylamino)pyridine used in the practice of this invention is a known material and can be obtained commercially. The compound can also be synthesized by conventional techniques such as that outlined in the patent to Goodhue et al. For example, 4 - (methylamino)pyridine can be prepared by the halogenation of pyridine to obtain the 4 - halopyridine followed by reaction with methylamine. If a salt is desired, the 4 - (methylamino)pyridine can be reacted with any suitable mineral or organic acid.

The 4 - (methylamino)pyridine can be applied to a surface from which birds are to be repelled in its pure form or as a dispersion in an inert carrier such as an inert organic solvent. Suitable inert solvents which can be used for this purpose include water, acetone, kerosene, ethyl acetate, and isoparaffinic hydrocarbons which boil in the range of about 260 to about 800° F. The compound can also be applied to the surface as a dust or powder in admixture with a solid carrier such as kieselguhr. The 4-(methylamino)pyridine alone or in admixture with the carrier can be blended with a suitable adhesive to prolong the adherency of the repellent to the surface. The use of an adhesive is generally preferred when the repellent is applied to the exposed ledges and window sills of buildings because it will be less affected by the action of rain and wind. Exemplary materials which can be used as carriers and which also function as an adhesive are rubber latices including those of the natural and synthetic type, such as polymers of butadiene, isoprene and copolymers with vinyl compounds such as styrene. Other compounds such as gelatins, substituted cellulose such as methyl cellulose, and low molecular weight polymers such as polyisobutylene, and petrolatum can also be employed. Latex has been found to be particularly suitable for a carrier and adhesive because of the high degree of repellency obtained when it is admixed with the 4 - (methylamino) pyridine.

The repellent of this invention can be applied to the surface from which birds are to be repelled by spraying, brushing, dusting, and the like. It is generally preferred to apply the compounds by spraying them onto a surface with a liquid dispersant serving as a carrier because an extremely uniform application can be achieved by this technique. When the repellent is dispersed in one of the solvents described above, it is generally preferred for the mixture to contain between about 0.1 to about 10 weight percent of the compound. When the repellent is dispersed in a solid carrier, it is preferably present in an amount within the range of 1 to 20 weight percent based upon the total weight of the mixture. Although these ranges are preferred for the reason that they have proven to be effective for repelling birds when applied to a surface, it is to be understood that concentrations above and below these ranges can be used if desired.

The actual concentration of the 4-(methylamino)pyridine repellent on the surface from which birds are to be repelled must be sufficient to effectively repel the birds from the surface. Although the actual concentration can vary over wide limits, depending in part upon the type of surface, the kind of birds, and climatic conditions, it is generally preferred that the repellent be applied in an amount sufficient to provide between about 0.01 to about 25 grams per square foot of surface area. In addition to its free base form, the 4-(methylamino)pyridine can also be conveniently and effectively applied in the form of a salt obtainable by simple combination with a mineral or organic acid. For example, the chloride, bromide, iodide, fluoride, nitrate, sulfate, phosphate, nitrite, acetate, propionate, butyrate, oxalate, malonate, succinate, tartrate, phthalate, benzoate, and citrate salts of 4-(methylamino)pyridine can be used.

Several runs were conducted to illustrate the utility and unexpected results of the 4-(methylamino)pyridine repellent of this invention. The following examples illustrate the results of these runs.

Example I

A wire screen cage having vertical sides was provided with two horizontal roosting bars. The bottom surface of the cage was immersed in a vessel containing water such that the roosting bars afforded the only horizontal resting surface. Four starlings were released in the cage and after they became accustomed to their surroundings it was observed that they spent about equal time on both roosting bars. The 4-(methylamino)pyridine repellent of the invention was then deposited on one of the roosting bars by means of an eye dropper from an acetone solution containing the repellent. The other roosting bar was coated with 4-(dimethylamino)pyridine from an acetone solution by means of the eye dropper. Both compounds were applied to provide a coverage estimated to be about 8 grams of compound per square foot of roosting surface. After the roosting bars had been coated in the manner described, the starlings were left undisturbed for a period of about 15 minutes. The number of starlings on each roosting bar was recorded at 15-minute intervals for a period of one hour to obtain a total of five readings. The following table reflects the total number of starlings on the roosting bars treated with the compounds indicated. A good repellent would reflect a value of zero and relatively ineffective repellent would reflect a value of 20 (four starlings on the roosting bar at each of the five observations).

TABLE I

| Compound applied to each roost: | Total starlings on the roosting bar for five observations at intervals of 15 minutes |
|---|---|
| 4-(methylamino)pyridine | 0 |
| 4-(dimethylamino)pyridine | 20 |

Example II

A cage having a single roosting bar was provided with sloping sides and a plurality of small diameter wires strung across the bottom. The sides of the cage and the bottom surface are designed to discourage resting in any other place but the roosting bar. A roost index defined as the ratio of the time spent by the birds on the roosting bar to the total elapsed time was used to determine the effectiveness of a compound. A perfect bird repellent would result in a roost index of zero. A roost index of 1 would indicate a completely ineffective repellent.

Two starlings were released in the cage and after they had become accustomed to their surroundings it was observed that they spend approximately 95 percent of the time on the roosting bar. A solution of 4-(methylamino)pyridine in acetone was then spread over the upper surface of the roosting bar to provide a concentration of repellent estimated at about 8 grams per square foot of surface area. On the basis of data collected from three runs with three different pairs of starlings, the average roosting index was calculated to be 0.40. Because of the severeity of this test, this roost index indicates the repellent of this invention to be very effective to repel birds. If the choice of resting places would have been greater, as would undoubtedly be the case under natural conditions, the roosting index would no doubt have been lower. Repellents with a roost index value in this range are known to exhibit excellent repellency when applied to buildings and other natural roosting locations.

Although the invention has been described in considerable detail, it is obvious that many variations and modifications can be made without departing from the spirit and scope thereof.

We claim:

1. A method of repelling birds from a roosting surface, which method comprises exposing said birds to the action of an effective amount of 4-(methylamino)pyridine which has been applied to said surface, said exposure being accomplished in the absence of oral ingestion of said 4-(methylamino)pyridine by said birds.

2. A method according to claim 1 wherein the 4-(methylamino)pyridine is applied in an amount to provide about 0.01 to about 25 grams of 4-(methylamino)pyridine per square foot of said surface.

3. A method according to claim 1 wherein the 4-(methylamino)pyridine is applied to said surface in the form of a dust dispersed in kieselguhr.

4. A method according to claim 1 wherein said 4-(methylamino)pyridine is applied to said surface by means of a liquid carrier selected from the group consisting of water, acetone, kerosene, ethyl acetate, and isoparaffinic hydrocarbons which boil in the range of from about 260 to about 800° F.

5. A method according to claim 1 wherein said 4-(methylamino)pyridine is applied to said surface in admixture with an adhesive selected from the group consisting of latex, gelatin, methyl cellulose, polyisobutylene, and petrolatum.

6. A method according to claim 1 wherein said 4-(methylamino)pyridine is applied in the form of a salt selected from the group consisting of chloride, bromide, iodide, fluoride, nitrate, sulfate, phosphate, nitrite, acetate, propionate, butyrate, oxalate, malonate, succinate, tartrate, phthalate, benzoate, and citrate.

References Cited

UNITED STATES PATENTS 3,150,004  9/1964  Goodhue _____ 107—46

ALBERT T. MEYERS, *Primary Examiner.*

S. FRIEDMAN, *Assistant Examiner.*